Nov. 9, 1954
W. K. BLEDSOE ET AL
2,694,180
TESTING OF ELECTRICALLY CONDUCTIVE FILMS
ON GLASS PANELS AND THE LIKE
Filed Feb. 16, 1951
3 Sheets-Sheet 1
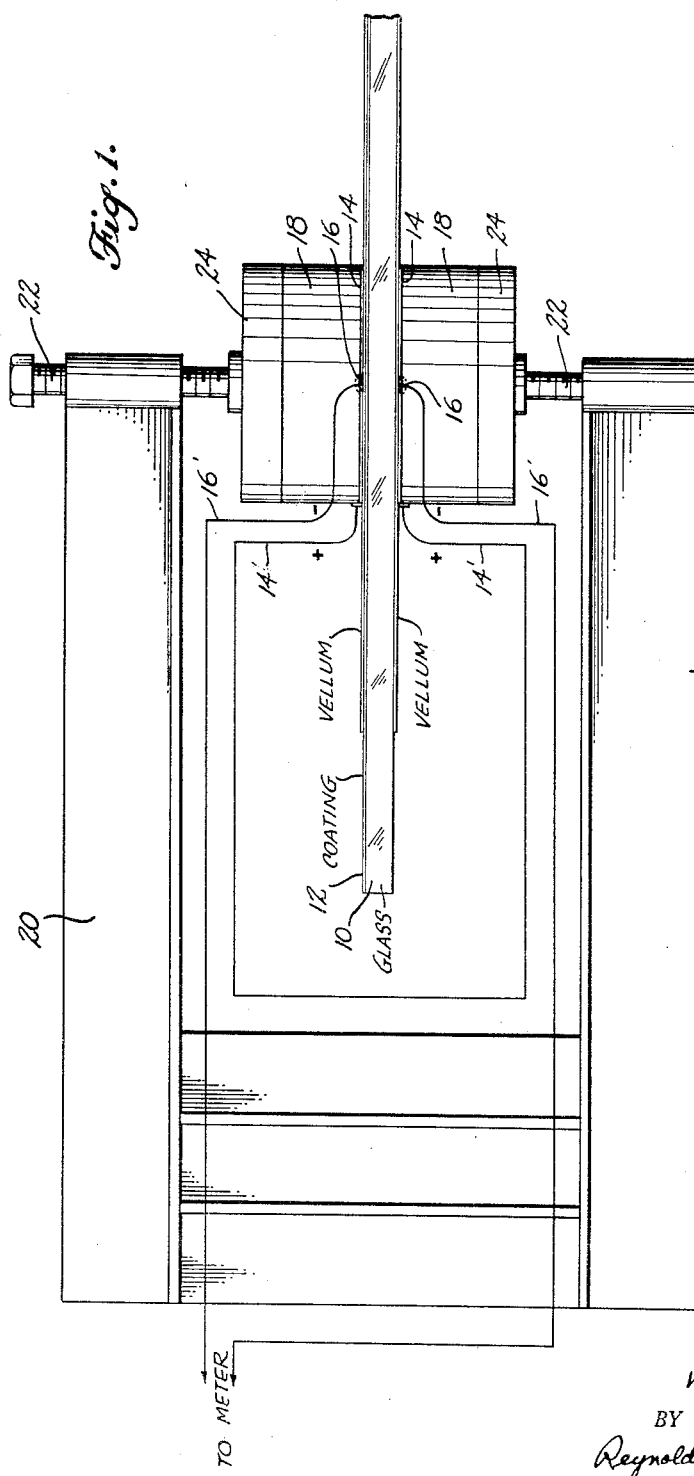
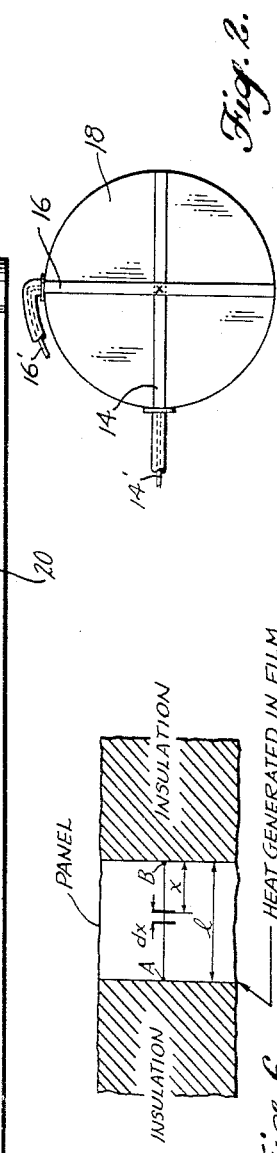
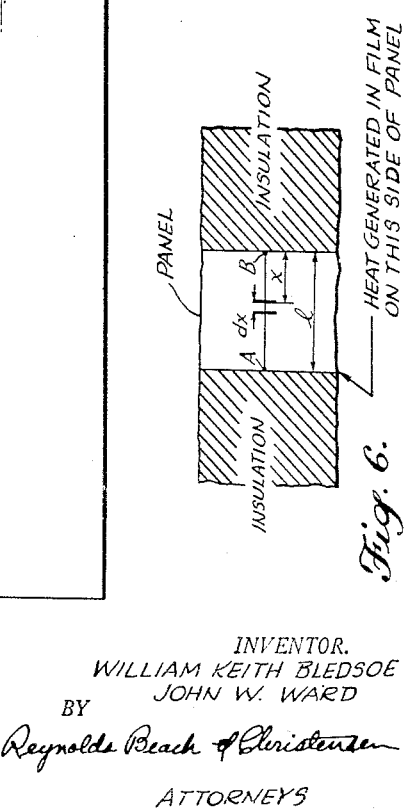
INVENTOR.
WILLIAM KEITH BLEDSOE
JOHN W. WARD
BY
Reynolds Beach & Christensen
ATTORNEYS

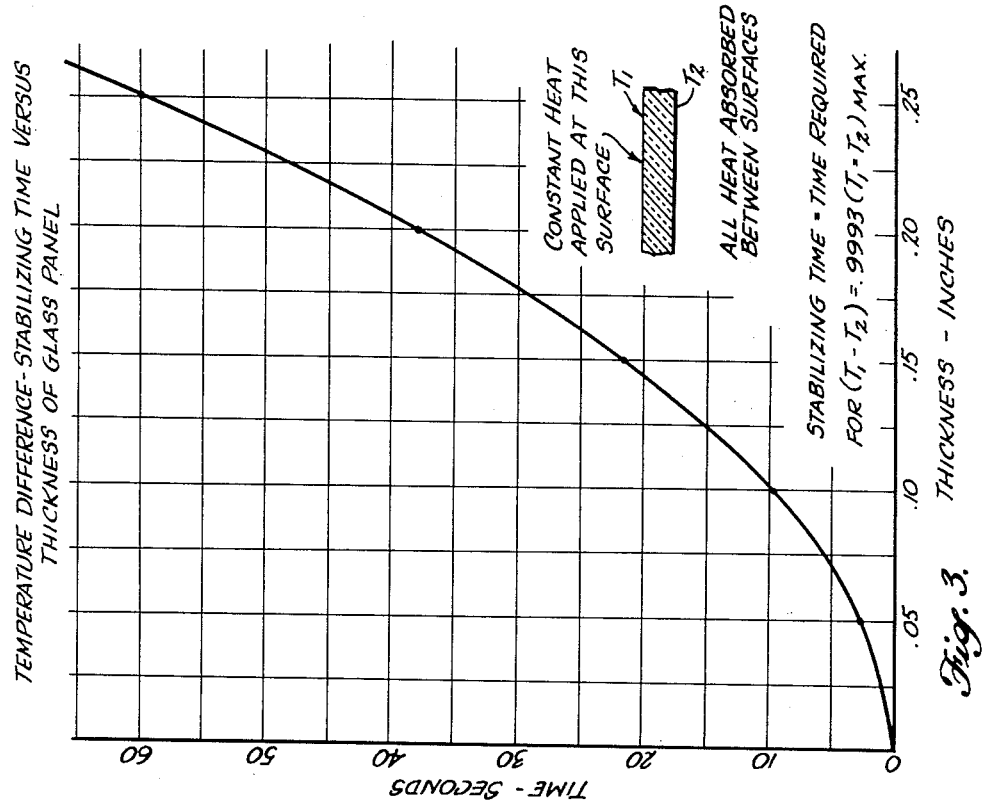
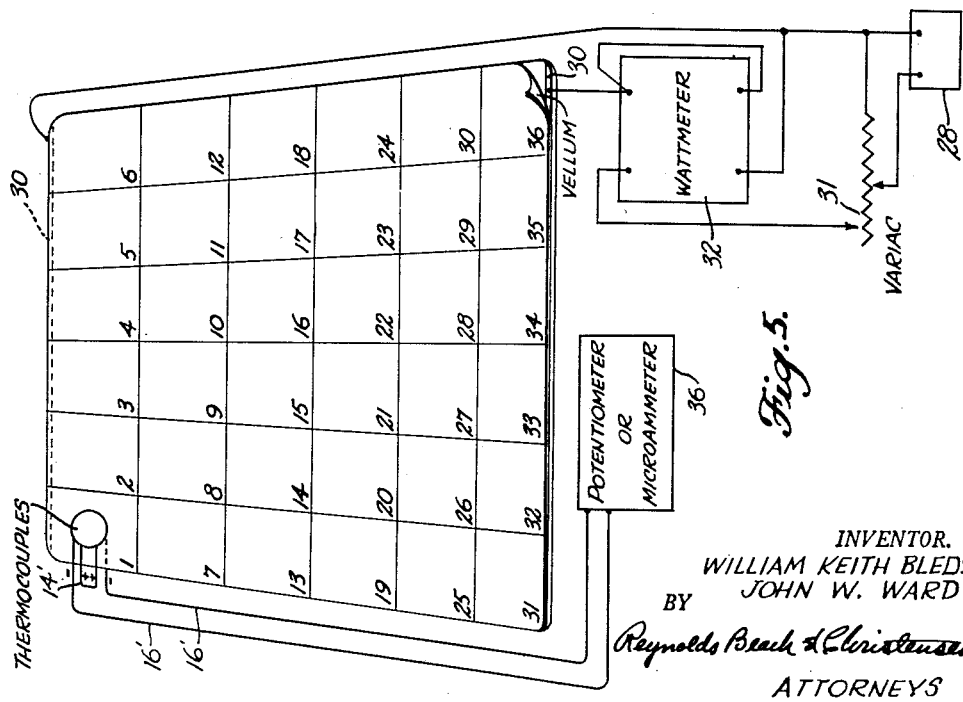

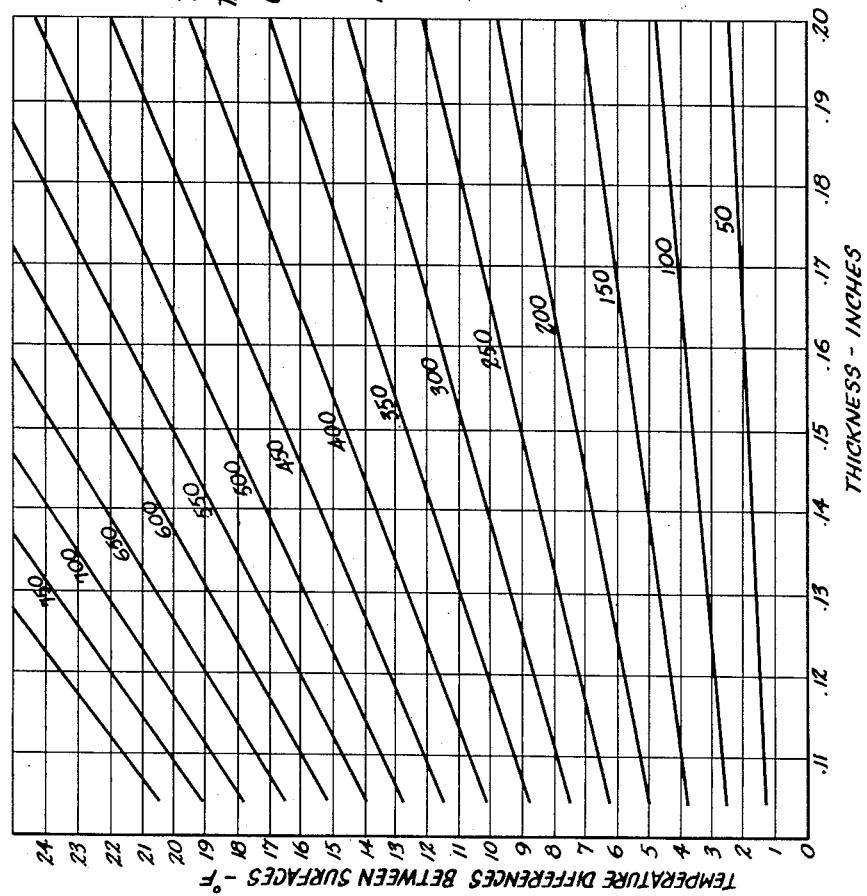
Fig. 4.

United States Patent Office 2,694,180
Patented Nov. 9, 1954

2,694,180

TESTING OF ELECTRICALLY CONDUCTIVE FILMS ON GLASS PANELS AND THE LIKE

William Keith Bledsoe and John W. Ward, Seattle, Wash., assignors to Boeing Airplane Company, Seattle, Wash., a corporation of Delaware Application February 16, 1951, Serial No. 211,316

9 Claims. (Cl. 324—32)

This invention relates to an improved method for testing the transparent electrically conductive microscopically thin coating on glass panels, such as are now being used in airplane electrically heated windshields, for example. Patent No. 2,429,420, October 21, 1947, to McMaster, discloses one example of a conductively coated glass panel. "Electrapane" glass panels of the Libbey-Owens-Ford Glass Company and "Nesa" glass panels of the Pittsburgh Plate Glass Company are commercial products of the same general type. While the invention is applicable to the testing of the conductive films of such glass panels, it will be appreciated as the description proceeds that in certain respects it has broader application, relating generally to the measurement of heat applied or generated at one side of a panel or sheet when certain described test conditions are maintained.

One desirable test for panels of the kind indicated is for uniformity of the conductive coating as a heat source, it being imperative in the airplane windshield application, for example, that material differences in operating temperature in different areas of the panel be avoided in order to prevent mechanical stresses which might be sufficient to crack the glass. Another desirable test which also gives a general indication of uniformity of the film, but is primarily applicable in connection with ascertaining a suitable "control spot," i. e. location on the panel for placement of the temperature sensing element by which power flow to the film in operation is automatically regulated, is for determining certain power constants of the film. Such power constants may be calculated from information as to total power input to the film, power concentration at the hottest spot on the film and power concentration at any selected control spot. Reliable information afforded by these tests, or equivalent information concerning that type of product, is essential to both manufacturer and user as an indication of acceptable quality.

In the past quality control testing of such conductively coated glass panels has been carried out by rather critical and time-consuming methods. The technique usually followed was to measure temperature of a panel in its different areas of interest under stabilized conditions of panel temperature, power flow to the film, and ambient atmosphere temperature, etc. Complete stability in all respects was very difficult to achieve in a practical test arrangement. Moreover, the method was inherently time-consuming because of the long delay required for the panel under test to attain stable operating temperature after heating power was first applied to the film.

The present invention is aimed generally at providing quality control testing methods for such panels or the like which may be carried out in a fraction of the time formerly required and with greater accuracy, being also less critical and difficult with respect to necessary test conditions to be observed. Viewed more generally, the invention is directed to a method by which heat entering an insulating panel at a point on one side thereof, for example, may be accurately measured with convenience and relative rapidity.

A more specific object of the invention is a method of the type described in which a minimum of test apparatus and associated equipment are necessary.

With these and other objects in view as will hereinafter appear, the novel method in its basic aspect involves the measurement not of panel temperature as heretofore, but of temperature difference between corresponding points on opposite sides of a panel, whereby heat applied or generated at one such point or side thereof may be determined from a knowledge of the thermal resistivity of the panel material, and the latter's thickness. It is found that if substantially all the heat generated or applied at the one surface is stored in the panel then the temperatures at the point of heat application and the corresponding point on the opposite side of the panel will rise at the same uniform rate and will differ by a constant amount, such rate of rise and difference being directly proportional to the heat intensity. Thus instead of waiting a matter of many minutes for panel temperature to reach a stable value before taking measurements as in past practice, for example, now all of the necessary temperature measurements, and in particular the temperature difference as between opposite points on the panel, may be made almost immediately after heating power is applied to the conductive film. Only a very short period of time is required for such temperature difference to become substantially constant or stable, depending upon the thermal resistivity and thickness of the panel. Moreover, such temperature difference being constant during rise of temperature of the panel may be read conveniently on a single difference-indicating meter such as a microammeter, for example. The temperature difference measurements at selected locations on the panel are then readily converted into heating power per unit area in the film at such locations.

Applying the foregoing general method to the quality control testing of conductively coated glass panels, for example, the uniformity of the film in all areas of the panel may be determined according to the first named test briefly mentioned at the outset by first dividing the area of the panel into squares or other geometric figures of equal area, between the spaced electric terminal zones of the panel. Temperature differences between opposite sides of the sheet at the centers of the different squares are measured, together with the total power going into the film. From the temperature difference measurements power per unit area is determined by graphic or equivalent mathematical technique and compared with average power per unit area as determined either mathematically or by dividing the total input power by the total effective area of the panel, and the uniformity of the film thereby ascertained.

The second mentioned test, namely for power constants of the film in connection with selecting the proper location for the temperature-sensing element, is more easily conducted. It involves temperature difference measurements at the hot spot of the film (i. e. the point at which wax or frost, for example, will melt first after electric power is applied to the film) and at different possible control spots. From these measurements the best location for the control spot may be selected by analyzing the power constants of the film in each location and selecting the most favorable one.

While the invention is described herein as applicable to the testing of conductively coated glass panels before they are assembled with one or more additional sheets or panels into composite windshields or the like, it will be understood that the fundamental aspects of the method may be applied even in case of a composite panel having an internally located film. This may be done if the insulating panel material on either side of the film is of known heat conductivity and thickness and there is a difference or unbalance either in thickness or heat conductivity as between opposite sides so that a measurable temperature difference results between corresponding points on opposite sides of the composite panel as the film is being heated.

The foregoing and other aspects and advantages of the invention will become more fully evident from the following detailed description with reference to the accompanying drawings.

Figure 1 is a simplified side elevation view of test apparatus set up to detect temperature of opposite sides of a coated glass panel in a selected location thereon.

Figure 2 is a face view of one of the two opposing thermocouple instrumentalities used for measuring such temperature.

Figure 3 is a graph showing the relationship between thickness of the glass panel and time required for the temperature difference between opposite points on the panel to reach substantial constancy following application of electric power to the conductive film.

Figure 4 is a graph which may be used for converting a temperature difference measurement into heating power per unit area in the film at the measurement location.

Figure 5 is a simplified schematic view illustrating apparatus used in the improved test method as applied to determining uniformity of a conductive film effectively over the entire area of the panel between electric terminal zones, the panel being rectangular and shown in perspective in the figure.

Figure 6 is a diagram used as a basis for a mathematical analysis of the test method in its fundamentals.

The theoretical basis of the present method for quantitative heat, hence power, measurements of a film-heated panel may be outlined briefly by reference to Figure 6. Points A and B are opposite locations on the panel, being temperature measurement locations under actual test conditions. The panel is assumed to have a thermal capacity coefficient, C, and a thermal resistivity coefficient, R. Heat input I (in B. t. u.'s per hour per square foot) at point A flows perpendicularly from the film-covered surface, all heat being retained between the A and B surfaces for purposes of the analysis. (Note that in a practical test set-up, such as that to be described, not all, but substantially all heat is retained in the panel in the brief period of any test, and if the external media or insulation on both sides of the panel are substantially balanced the test results are practically unaffected by any small heat loss from the panel faces.) During test conditions input power remains constant after being initially applied. The equation for temperature rise ($e$) of any point along line A, B, at distance $x$ from point B, at time $t$ after power is first applied is derived from the following equation in Heaviside Operational Calculus:

$$e = -\frac{RI}{m} \cdot \frac{\cos mx}{\sin ml}$$

where $m$ is a function of the Heaviside operator $p$, thus:

$$m^2 = -pCR, \quad \left(p = \int_0^t dt\right)$$

Letting $e_g$ represent the temperature rise at point A, and $e_0$ represent the temperature rise at point B, the equations for these two variables are as follows:

$$e_g = -\frac{RI}{m} \cdot \frac{\cos ml}{\sin ml}$$

$$e_0 = -\frac{RI}{m} \cdot \frac{1}{\sin ml}$$

By expanding these two equations by the applicable Heaviside expansion formula it is possible to show that $$e_g = \frac{It}{Cl} + \frac{RIl}{3} - \frac{2RIl}{\pi^2}\left\{\frac{e^{-\pi^2 t}{CRl^2}} + \frac{e^{\frac{-4\pi^2 t}{CRl^2}}}{4} + \frac{e^{\frac{-9\pi^2 t}{CRl^2}}}{9} + \ldots\right\}$$

and when $t$ becomes "large"

$$e_g \rightarrow \frac{It}{Cl} + \frac{RIl}{3}$$

or $$\frac{de_g}{dt} \rightarrow \frac{I}{Cl}$$

Similarly it may be shown that as $t$ becomes "large,"

$$e_0 \rightarrow \frac{It}{Cl} - \frac{IRl}{6}$$

or $$\frac{de_0}{dt} = \frac{I}{Cl}$$

Furthermore by subtraction of the above, the difference in temperature of points A and B is as follows:

$$e_g - e_0 \rightarrow \frac{RIl}{2}$$

Thus as $t$ becomes "large" the points A and B approach a constant temperature difference.

Finally, it may be shown that the electrical power per square foot in the film converted into heat, at point A, for instance, may be determined from the temperature difference between points A and B, from the following:

$$\frac{\text{Watts}}{\text{ft.}^2} = 4.11 \frac{(°\text{F. difference})}{(1'', \text{ in inches})}$$

If the expansion equations expressed above for the temperature variable $e_g$ and $e_0$ are subtracted one from the other and various values of time in fractional hours substituted for $t$ it will be found that the difference between these temperature variables reaches 99.93% of its maximum value when $t$ equals one minute in the case of the usual ¼ inch glass panel used in airplane windshields and in less time if the panel is of lesser thickness (see Figure 3). This has been verified experimentally, that is the indication of any metering instrumentality capable of indicating temperature difference between corresponding points on opposite sides of the panel becomes substantally constant in less than a minute's time and may be read for test purposes within that period of time. Thus $t$ in fact becomes "large" for purposes of the foregoing analysis and present test method in less than one minute for ¼ inch glass panels, which is considerably less than the test time required in prior methods for temperature conditions to stabilize.

Referring to Figures 1 and 2, the glass panel 10 has but one face coated with the microscopically thin transparent electrically conductive film 12. If the other side of a panel being tested were also to be coated with such a film, only one of the films will be heated by current flow at a given time during the tests, as each film must, of course, be tested separately if its individual characteristics as a heat source are to be determined. In the test set-up appearing in Figure 1 it is immaterial for theoretical purposes of the test whether the electrically heated film is on the upper or lower face of the panel, or whether the panel is horizontal or otherwise disposed.

The temperatures at corresponding points on opposite sides of the panel in the illustrated case are measured by thermocouples, each consisting of crossed iron and constantan ribbons 14 and 16, respectively, approximately 0.0025 inch thick. Ribbons of that slight thickness may be rolled from Number 30 wire, for example, and the ribbons bonded together at their intersection by tack welding. The object of employing ribbons of that size and form is to afford a high ratio of the contact area of the ribbon with the surface under test to the mass of the ribbon, a ribbon of the least possible mass being desired in order to enable the thermocouple to follow changing temperatures very closely, thereby to provide an output voltage proportional to temperature. The extension leads 14' and 16' for the thermocouple ribbons should be of the same iron and constantan (or other) wire, from which the ribbons themselves are rolled, and the extension leads thermally insulated over a length of at least two or three inches from the iron constantan junction in the case of ribbons approximately two inches in length, as shown in Figure 2, so that air drafts will not influence thermocouple output voltage. As will be evident, thermopiles consisting of two or more thermocouples may be used if larger output voltages are desired, or, alternatively, temperature sensing elements of a different type altogether may be used.

The thermocouple ribbons in each case are mounted on the end face of an insulating block 18 preferably comprising a cellulose acetate foam cylinder, two inches in diameter and one-half inch thick. The thermocouple-supporting block material should be selected to absorb and conduct away a minimum of heat from the test surface. Also, the block should be sufficiently firm for transmitting a large pressure to the thermocouple ribbons, which project from the block face and must not sink in too deeply under repeated or continued applications of block pressure to the test face if uniform results are to be achieved. Cork and balsa wood are satisfactory block materials from the thermal standpoint, but somewhat soft for mechanical purposes. It was found that rubber was unsatisfactory because of its higher thermal conductivity and storage capacity. The manner in which the thermocouple ribbons are mounted on the face of the insulating block may vary, but preferably if more than one thermocouple is used the couples should be placed symmetrically with relation to the block face, and the thermocouples of opposing blocks be placed on their respective block faces so as to be disposed directly opposite each other on the panel. If the measuring points (the thermocouple ribbon intersections in the illustrated case) are not directly opposite each other the necessary conditions of the test are not met. It is also desirable that the thermocouples carried by the opposing blocks have approximately equal areas of contact with the test faces of the panel.

In order to locate the thermocouples directly opposite each other on the panel and bring them to bear firmly against the panel faces, the illustrated test apparatus includes a suitable rigid frame 20 having long cantilever arms or the like carrying axially aligned pressure screws 22. A metal disk 24 carried by each such screw constitutes a support for the thermocouple insulating block 18. Since the thermocouple ribbons project from the supporting block face, the total thermocouple pressure against the panel faces necessary to establish uniform thermocouple ribbon pressure is, of course, directly a function of the number or area of thermocouples on a block face. This total pressure in the case of a thermopile made up of a group of thermocouples may exceed two hundred pounds for uniform thermal contact of all thermocouples with the panel face. In practice satisfactory alignment and adequate pressure of the thermocouples against the panel are indicated by a comparatively rapid stabilization of the difference between output voltage of the thermocouples on opposite sides of the panel after the conductive film is energized.

In order to insulate the thermocouple ribbons electrically from the conductive film on the panel face a thin sheet of paper 26 such as vellum is interposed therebetween. However, because a time lag between panel face temperature and thermocouple temperature is introduced as a result of such insulation it is important that the thickness and nature of insulation be fairly accurately duplicated on the opposite or uncoated side of the panel. If this insulation is the same on both sides of the panel its effect on accuracy of the tests is negligible, whether one sheet or six sheets of vellum are used on each side, for example.

The electrical connections for conducting a test appear in Figure 5. Electric current from a source 28 enters and leaves the conductive panel film through busses 30 contacting the film in generally parallel terminal zones, in this instance extending along opposite edges of the panel. A wattmeter 32 connected in the energizing circuit provides an indication of total power input to the film. An adjustable-voltage input power transformer or "Variac" 34 enables adjusting the input voltage in order to maintain constant power input during a test, despite possible variations in voltage of the source 28. As shown in both Figures 1 and 5 the thermocouple on one side of the panel is connected in series with that on the opposite side thereof, with opposing polarity, so that the potentiometer or microammeter 36 or other electrical measuring instrument will read in terms of the difference in thermocouple E. M. F.

Thus from the single meter reading, which stabilizes in less than a minute's time as previously explained, the desired information of temperature difference between corresponding opposite points of the panel may be obtained directly by reference to the voltage-temperature calibration curve of the combined thermocouples. The time required for the temperature difference, hence the reading of meter 36, to become stable varies approximately as the square of the thickness of the glass panel, as shown in Figure 3. If a succession of readings is to be taken for different locations on a panel, in order to minimize the possibility of experimental error due to slight imperfections in the test apparatus or otherwise, it is considered desirable to employ a time indicator, such as an electric clock with a sweep second hand and take the temperature difference readings at the same time after power to the conductive film is initially turned on in each location of the thermocouples.

The graph appearing in Figure 4 may be used in converting any temperature difference reading obtainable from the thermocouple differential output meter into power (watts) per unit area (square foot), dissipated in the conductive film. It should be noted, however, that the curves in this particular figure represent the values for a particular glass, namely one having a thermal resistivity of approximately 1.7, which is that ordinarily used for airplane heated windshields. A different set of curves would apply to other materials having a different thermal resistivity. In lieu of referring to this graph for conversion of temperature difference readings into heating power per unit area at the measurement locations the following equation may be used:

$$\frac{\text{Watts}}{\text{ft.}^2} = \frac{(4.11)(\text{degrees F. difference})}{(\text{Thickness of panel, in inches})}$$

Because it is not readily convenient to measure thickness of a glass panel at considerable distances from its outer edge, the thickness at opposite edges in line with an intermediate test loction may be measured and the thickness at the latter location assumed to be the mean between the edge thickness measurements.

The above described technique may be applied to testing of a conductive film for uniformity by dividing the area of a panel into equal grid sections, such as squares, between the electric terminal zones or busses 30, as shown in Figure 5, for example, and measuring temperature difference at the center of each grid section by a series of location settings of the thermocouples and corresponding readings of the thermocouple differential output meter. From these readings the power per unit area in each of the grid sections may be determined as previously outlined. The average power per unit area is then determined either by a mathematical averaging of the results for all the different grid sections, or by dividing the wattmeter reading by the total area of the panel between the electric terminal zones. The deviation of each grid section power quantity from the average then constitutes a direct indication of nonuniformity of the film in the different areas. If this deviation in any instance is excessive the panel would be unsafe for airplane usage.

It will be noted that the average power per unit area obtained by the method of dividing the wattmeter reading by the total area of the panel may be compared with the average power figure determined by the mathematical averaging method. Such a comparison affords a useful check of the accuracy of the determinations of heating intensity from temperature difference readings, hence of the test as a whole. The close comparison of these average power quantities in a number of actual tests demonstrated the general accuracy of the theory of the tests and the close approximation of the described actual test conditions with the theoretically assumed conditions, especially as to the condition of negligible heat loss from the panel during a test.

In addition to the all-over uniformity test just described, it is also desirable to be able to obtain an indication of the so-called power constants of the film in selected areas. The power constant test may be carried out more rapidly than the all-over uniformity test previously outlined and as actual experience shows, affords a reasonably accurate indication of uniformity of the film as well affording a procedure by which the best location for the control spot may be established within the permissible zone, usually along one edge. The three power constants used for these purposes are as follows:

$$K_M = \frac{\text{Watts input/heated area}}{\text{Watts/ft.}^2 \text{ at hot spot}}$$

$$K_H = \frac{\text{Watts/ft.}^2 \text{ at hot spot}}{\text{Watts/ft.}^2 \text{ at control spot}}$$

$$K_A = \frac{\text{Watts input/heated area}}{\text{Watts/ft.}^2 \text{ at control spot}}$$

The quantities necessary to determine these three power constants are readily determined by simply applying the herein described test method and apparatus for taking a temperature difference measurement at the hot spot of the film and at a tentative or finally established control spot, and reading on the wattmeter the total power input to the film.

The test procedures followed in arriving at the power constants is briefly as follows. First, the hot spot of the film is located by applying an input power in the ordinary case of at least 600 watts per square foot and noting the first point at which paraffine or frost melts on the panel. The thickness of the panel at the hot spot and selected control spot is then measured, as is the heated area between busses of the panel. Two meters may be used in this test, if desired, in which case two thermocouple sets will be applied and temperature difference readings taken at the hot spot and selected control spot, respectively, while constant input power is maintained as read from the wattmeter. Again, after power is first applied to the conductive film approximately one minute is allowed for temperature differences to stabilize before the differential output voltages of the thermocouples at the hot and control spots are read on the respective meters. The meter readings are then converted to watts per square foot at the two measuring locations. From this information, together with the wattmeter reading of total input power to the film, the power constants $K_M$, $K_H$, and $K_A$ are computed.

The power constant $K_M$ for any given panel is fixed and should not differ greatly from unity if the panel is of acceptable uniformity. The power constants $K_A$ and $K_H$ depend upon the test location selected for the control spot. Several possible locations for the control spot may be tested in the described manner. The control spot finally selected might be chosen, if the film is non-uniform and thereby affords a choice, to provide a power constant $K_H$ which is low and thereby minimize the panel operating temperature at the hot spot. However, a power constant $K_A$, which is high, is likewise desirable to afford maximum deicing ability of the windshield panel. These two objectives are mutually repugnant and a choice must be made as to which, if either, should be favored over the other. Ordinarily, it is preferable that the deicing ability of the panel be made a maximum, even though this results in a somewhat higher $K_H$ than might be desirable.

In making individual temperature readings by use of the thermocouple sets, whether for the power constant tests or for the all-over uniformity tests of a panel, it is sometimes found that the thermocouple differential output as read on the difference-indicating meter 36 does not always return to zero when the power is turned off in the same length of time as that required for the meter reading to stabilize when the power is turned on, which is about a minute in the case of a ¼ inch airplane windshield single panel. Instead the meter might at the end of one minute's time after power is removed provide a reading which is a definite small percentage of the maximum difference reading obtained during the test with the film power on. This discrepancy is usually due partly to the lack of perfect symmetry of the thermocouple junction assemblies. Assuming that the condition which produced the difference of temperature between the junctions of the thermocouple sets with the power off also exists when the power was on, hence affected the temperature difference reading by the same amount, it follows that the algebraic difference between the "power-on" and "power-off" meter readings should be used as a measure of the true temperature difference between the surfaces of the panel during the test.

We claim as our invention:

1. The method of quality control testing for uniformity of an electrically conductive film coating adherent to an insulating panel and carrying an electric current passed edgewise therethrough between spaced generally parallel electric terminal zones thereon, comprising passing electric current through the coating, measuring total electric power input to the film carrying current between such zones, dividing the area of such panel between such electric terminal zones into similar grid sections of substantially equal area, and measuring temperature difference between opposite sides of the composite film-coated panel at the approximate centers of such grid sections, whereby such temperature difference measurements may be converted into corresponding quantities representing power consumed per unit area by the conductive film in the respective grid sections for comparing such quantities with the effective average value of measured power consumed per unit area between such contact zones, and thereby obtaining an indication of non-uniformities of the film in the different sections of the panel area.

2. The method of quality control testing for uniformity of an electrically conductive film coating adherent to an insulating panel and carrying an electric current passed edgewise therethrough between spaced generally parallel electric terminal zones thereon, comprising passing electric current through the coating, measuring total electric power input to the film carrying current between such zones, measuring temperature difference between opposite sides of the composite film-coated panel at a plurality of spaced locations thereon in the area between such zones, whereby such temperature difference measurements may be converted into corresponding quantities representing power consumed per unit area by the conductive film in the measurement locations for comparing such quantities with the effective average value of measured power consumed per unit area between such contact ones, and thereby obtaining an indication of non-uniformities of the film in the different measurement locations of the panel area.

3. The method of quality control testing for uniformity of an electrically conductive film coating adherent to an insulating panel and carrying an electric current passed edgewise therethrough between spaced generally parallel electric terminal zones thereon, comprising passing electric current through the coating, dividing the area of such panel between such electric terminal zones into similar grid sections of substantially equal area, measuring temperature difference between opposite sides of the composite film-coated panel at the approximate centers of such grid sections, whereby such temperature difference measurements may be converted into corresponding quantities representing power consumed per unit area by the conductive film in the respective grid sections for comparing such quantities with their effective average value representing average power consumed per unit area, and thereby obtaining an indication of non-uniformities of the film in the different sections of the panel area.

4. The method of testing uniformity of heating of one side of a material sheet over the test area of the side of such sheet to which the heat is applied, comprising dividing such test area of the sheet into similar grid sections of substantially equal area, applying heat to one side of the sheet including such test area, and measuring temperature difference between opposite sides of the sheet at the approximate centers of such grid sections, whereby such temperature differences may be compared with their effective average value for obtaining an indication of non-uniformities of heat application to the different sections of the sheet test area to which the heat is applied.

5. The method of quantitatively measuring rate of heat delivery to a material sheet at a given test point on one side thereof, comprising delivering heat to the sheet at such test point thereof, measuring temperature difference between such point and the corresponding point on the opposite side of the sheet after such temperature difference reaches a substantially steady state condition but before temperature on any one side of the sheet reaches steady state condition, while minimizing heat loss from the sheet by insulating the same from the atmosphere in the vicinity of such points, whereby such temperature difference measurement constitutes a measure of such heat delivery rate and may be converted into the latter quantitatively by reference to the thickness and effective thermal conductivity of the material.

6. The method of quantitatively measuring rate of heat production from a heat source in direct conductive relation to a material sheet at a given test point on one side thereof, comprising producing heat by said heat source for conduction to said test point, measuring temperature difference between such point and the corresponding point on the opposite side of the sheet after such temperature difference reaches a substantially steady state condition but before temperature on any one side of the sheet reaches steady state condition, while minimizing heat loss from the sheet by insulating the same from the atmosphere in the vicinity of such points, whereby such temperature difference measurement constitutes a measure of such heat production rate and may be converted into the latter quantitatively by reference to the thickness and effective thermal conductivity of the material.

7. The method of selectively locating the control spot for an electrically conductive film adhered to one side of an insulating panel and adapted for carrying an electric heating current passed edgewise therethrough between spaced electric terminal zones thereon, comprising passing electric current through said film, measuring the average power per unit area absorbed by the film, determining the location of the hot spot of such film during heating thereof, measuring temperature difference between opposite sides of the panel at such spot, tentatively selecting one or more possible control spot locations, and measuring temperature difference between opposite sides of the panel at such control spot locations during heating of the film, whereby such hot spot and control spot temperature difference measurements, converted into power consumed per unit area at the respective spots, may be compared quantitatively with such average input power measurement to determine thereby the effective power constants of the film and enable selecting the preferred control spot location on the basis thereof.

8. The method of measuring heat generated by an electrically conductive film on one side of an insulating panel in which substantially all of such heat is retained by insulating both sides thereof, comprising passing electric current through such film, and measuring temperature difference between opposite sides of such panel at a selected location thereon after stabilization of such temperature difference but before stabilization of temperature on either side of such panel.

9. The method defined in claim 8, wherein the temperature difference measurement is made by separate temperature sensing instrumentalities applied to opposite sides of the panel, with their outputs applied in subtractive relationship to a difference-indicating metering instrumentality, which is read when its indication becomes substantially stable.

References Cited in the file of this patent

UNITED STATES PATENTS

| Number | Name | Date |
|---|---|---|
| 939,109 | Switzer | Nov. 2, 1909 |
| 2,264,968 | De Forest | Dec. 2, 1941 |

FOREIGN PATENTS

| Number | Country | Date |
|---|---|---|
| 459,930 | Germany | May 14, 1928 |
| 723,959 | France | Jan. 23, 1932 |